Oct. 18, 1938.　　　J. H. VAN UUM　　　2,133,366

SECURING SPRING CLIP

Filed Aug. 20, 1937

INVENTOR.
JOHN H. VAN UUM

BY John H. Leonard
HIS　　　ATTORNEY.

Patented Oct. 18, 1938

2,133,366

UNITED STATES PATENT OFFICE 2,133,366

SECURING SPRING CLIP

John H. Van Uum, Lakewood, Ohio

Application August 20, 1937, Serial No. 160,136

7 Claims. (Cl. 85—5)

This invention relates to a spring clip retaining device for securing bead trim or a decorative member to an apertured support, such as automobile bodies and the like. In automobile body construction, the decorative bead trim is often inadvertently removed or is allowed to move in one or more directions causing an undesirable vibration and rattle of the trim member due to the inherent defects of the spring clip retaining device which secures the trim to the body.

The principal object of the present invention is to provide a spring clip retaining device which may be easily and readily installed in an apertured support and onto which the bead trim may be snapped thereafter.

Another object is to provide a spring clip having a head portion which, when the clip is in position to secure the trim member to the support, lies between the inturned flanges of the trim member in such a manner as to prevent the trim member from becoming dislodged, loosened, or moved in any direction with respect to the supporting member.

Another object is to provide a spring clip retaining device in which the leg portions have positive locking shoulders which engage the inner surface of the support to positively lock the clip against removal axially of the aperture.

Another object is to provide a spring clip retaining device in which the spring effect of the portions received in the aperture are segregated and separated from the spring effect of the resilient trim-engaging portions of the head so that the spring effect of the support-engaging portion is independent of the spring effect of the trim-engaging portions though the former portions and remainder of the head portions are utilized to mutually assist and augment firm engagement with the support and trim member, respectively.

Still another object is to provide a spring clip retaining device which will remain effectively in proper position on the support during installation of the trim member in order that the trim member may be easily and conveniently snapped into place on the head portion of the spring clip.

Other objects and advantages will become apparent from the following specification, wherein reference is made to the drawing in which Figure 1 is an end elevation of a spring clip retaining device embodying the principles of the present invention;

Figure 1:
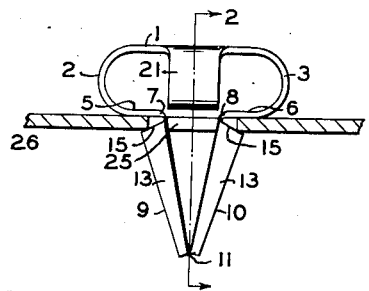

Referring first to Figures 1 to 5, inclusive, the illustrative embodiment of the clip comprises a single flat piece of spring metal bent downwardly intermediate its ends to provide a portion in the form of a top 1 and supplemental portions 2 and 3 at the ends thereof and preferably in the form of loops, which are concave toward and in spaced relation to each other. Forming a continuation of and extending from the loops 2 and 3 are inwardly extending laterally spaced lands 5 and 6 which are engageable with the outer surface of the support, when the spring clip device is installed, for spacing the trim-engaging portions of the clip a proper distance from the outer face of the support. The top 1, loops 2 and 3, and lands 5 and 6 provide the head portion of the clip.

The strip of spring metal at the ends of the lands 5 and 6, remote from the loops 2 and 3 is bent downwardly abruptly and convergently toward its free ends, as indicated at 7 and 8, to provide convergent leg portions 9 and 10 which abut each other at their free ends, as indicated at 11, thereby defining a substantially V-shaped nose or shank portion. The lateral margins of the leg portions 9 and 10 are provided with flanges 13 which are bent outwardly at substantially right angles to the plane of the associated legs and are of gradually increasing width from the abutting ends of the legs toward the opposite ends. The upper end portions of the flanges 13 form sloping locking shoulders 15 positioned to engage the inner face of the support adjacent the aperture therein when the clip is installed.

Figure 2:
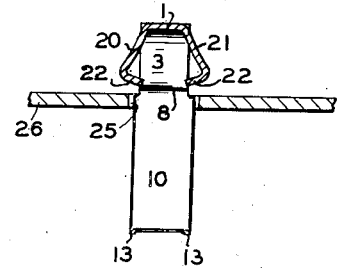
Figure 2 is a sectional view of the spring clip retaining device installed in the support and is taken on a plane indicated by the line 2—2 of Figure 1.
Figure 4:
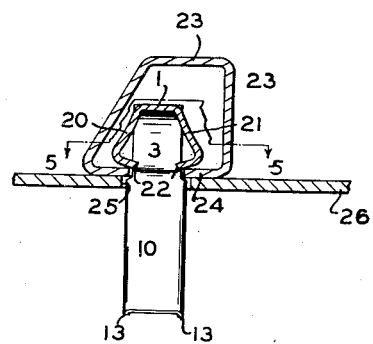
Figure 4 is a view of the spring clip retaining device illustrated in Figure 2, showing its relation to the supporting member and trim member after installation.

As illustrated in Figures 2 and 4, the lateral edges of the top portion 1 are provided with depending integral, resilient, locking fingers 20 and 21, the width of which lies in a plane substantially normal to or angularly disposed with respect to the axis of the nose. The lower or free end portions of the fingers 20 and 21 are bent inwardly and downwardly in the form of flanges 22 for effecting yieldable engagement with the inturned flanges of the member to be secured to the support.

The element such as bead trim 23, which is to be secured to the support is usually hollow and of substantially channel-shaped cross section with suitable inturned flanges 24 for engagement beneath the lower edges of the locking fingers 20 and 21.

During installation, the clip is inserted, nose foremost, in the aperture 25 from the outer surface of the support 26 with accompanying flexure of the leg portions 9 and 10 relatively together, the leg portions reflexing toward their normal condition after insertion to cause the sloping locking shoulders 15 to engage the inner surface of the support 26. The cam surfaces of the locking shoulders 15 enter the aperture 25 of the support 26 and firmly urge the lands 5 and 6 toward the outer surface of the support. Further, since each locking shoulder presents only an edge surface to the aperture of the support, they tend to dig into the metal of the support and thus anchor the spring clip device from rotation or movement in the aperture and will retain the spring clip device in proper position for applying the bead trim thereto. Due to the closed loop effect and cross section of the abutting legs 9 and 10, firm gripping relation of the clip in the support is maintained.

When the spring clip device is thus installed in the support 26, lands 5 and 6 engage the outer surface of the support to limit further inward movement of the clip and also space the trim-engaging flanges 22 a proper distance from the support to yieldably accommodate the inturned flanges 24 of the trim member 23, as illustrated in Figures 1 and 2. Thereupon the inturned flanges 24 of the trim member 23 are positioned on the locking fingers 20 and 21, Figure 3, and then pressed downwardly towards the support, whereupon the flanges 24 of the trim member 23 engage the cam surfaces of the locking fingers 20 and 21 and flex them relatively together until the flanges 24 pass beyond the locking fingers 20 and 21. Reflexure of the locking fingers causes the locking flanges 22 to engage the inturned flanges 24 of the trim member to lock the trim member against displacement axially of the aperture in the support. It will be noted that due to the sloping of the locking flanges 22 of the locking fingers irregularities in the thickness of the inturned flanges, or burrs occasioned during manufacture, are compensated for so that firm gripping relation between the support and trim member is maintained.

Furthermore, due to the closed loop effect of the abutting legs 9 and 10, flexure of the locking fingers is independent and segregated from the flexure of the legs 9 and 10, and flexure of the legs does not affect nor is dependent upon the locking fingers 20 and 21 and vice versa.

Figure 5:
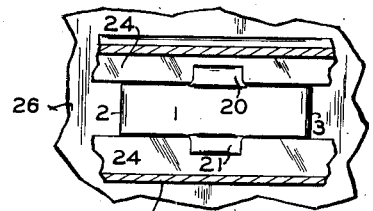
Figure 5 is a longitudinal section taken on the line 5—5 of Figure 4.
Figure 3:
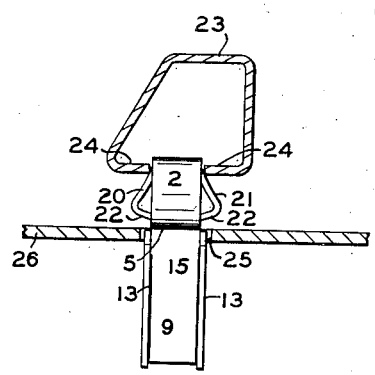
Figure 3 is an end elevation of a clip illustrating one relative position of the spring clip retaining device and trim member during installation of the trim member.

As better illustrated in Figures 3 and 5, the width of the top 1 and curved loops 2 and 3 is substantially the same as the width between the inturned flanges of the trim member to allow the loops 2 and 3 to pass therebetween. The edges of the loops 2 and 3, it will be noted, snugly engage the edges of the inturned flanges 24 of the trim member to constrain the spring clip device from rotation relative to the trim member and about the axis of the aperture and displacement from the member and support. Lateral movement of the trim member illustrated in Figures 3 and 4, which causes an undesirable rattle and in some cases accidental detachment of the trim member from the support is also prevented, due to the contact or engagement of the edges of the loops 2 and 3 with the edges of the inturned flanges 24.

Figure 6:
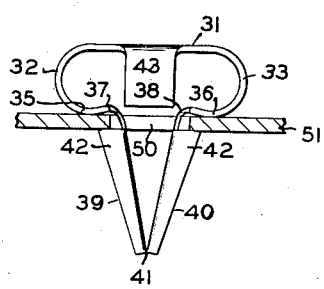
Figure 6 is an end elevation of a modified form of spring clip retaining device embodying the principles of the present invention.
Figure 7:
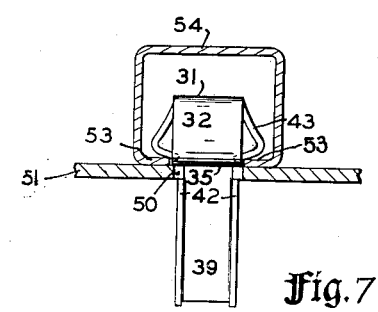
Figure 7 is an end elevation of the spring clip retaining device illustrated in Figure 6 showing its relation to the supporting member and trim member.

In the modified form of the invention illustrated in Figures 6 and 7, a spring clip retaining device having similar characteristics as the spring clip device above described, is illustrated. The modified clip comprises a single flat strip of spring metal having a top 31 and curved loops 32 and 33, which correspond with the top 1 and the curved loops 2 and 3 of the spring clip device illustrated in Figures 1 to 5, inclusive. The lands 35 and 36 which form a continuation of curved loops 32 and 33 are elongated in a direction normal to the axis of the abutting legs 39 and 40, however, are provided with upwardly extending portions 37 and 38 from the support to render the spring action of the legs 39 and 40 more effective.

The legs 39 and 40, which normally abut, as at 41, are provided with flanges 42, which extend at substantially right angles to the plane of the associated legs and have abrupt locking shoulders at their upper edges. The spring clip device, illustrated in Figures 6 and 7, is applied in the aperture 50 in the support 51 in the same manner as the clip illustrated in Figure 1. It will be noted that the curved loops 32 and 33 are somewhat wider than the loops 2 and 3 to accommodate the inturned flanges 53 of the trim member 54. The clip is first installed in the support 51 and the locking fingers 43 are properly positioned from the support spring by the lands 35 and 36, and then the trim member 54 is positioned on the clip and is pressed downwardly toward the support to cause the inturned flanges 53 of the trim member to engage the locking fingers 43 and be secured to the support in firm juxtaposition. The lateral edges of the curved loops 32 and 33 engage the edges of the inturned flanges 53 of the trim member 54 to prevent rotation of the spring clip device in the trim member and also lateral movement of the trim member in a plane parallel to the axis of the nose or shank portion of the spring clip device. It will therefore be noted that the spring clip devices above described will engage both the support and the trim member in such a manner as to prevent removal of the clip from the support and also prevent movement of the trim member in any direction with respect to the support and will firmly lock the trim member to the support in firm juxtaposition.

Having thus described my invention, I claim:

1. A spring clip device for securing a trim member having an opening in one face with inturned flanges therealong to the outer face of an apertured support having inner and outer faces and comprising a single piece of flat spring metal having a portion between its ends in the form of a top, supplemental portions at the respective ends of the top and terminating in spaced relation to each other and to the top, portions extending from said supplemental portions and in the form of legs receivable endwise through an aperture in the support, locking shoulders on the legs engageable with the inner face of the support when the clip is installed, the portions of said supplemental portions which are spaced from the top being engageable with the outer face of the support when the clip is installed in the support, said supplemental portions being snugly engageable edgewise with the edges of the inturned flanges of the trim for constraining the clip and trim from relative rotation and relative lateral movement, said top having portions in the form of depending locking fingers engageable within the trim member by flexure of said fingers and said fingers reflexing for securing the trim member to the support in firm juxtaposition to the outer face thereof.

2. A spring clip device for securing a trim member having an opening to an apertured support and comprising a single piece of flat spring metal having a portion intermediate its ends in the form of a top, and supplemental portions at the ends thereof, respectively, and terminating in spaced relation to each other and to the top, said top having independently flexible locking fingers receivable within the said trim member through the opening by flexure of said fingers, said fingers returning toward their normal position for securing the trim member to the support, said supplemental portions being engageable at their portions which are spaced from the top with the outer face of the support and spacing said fingers from the outer face of the support for assisting entry of the clip between the margins of the trim member defining the opening, and portions extending from said supplemental portions and in the form of convergent legs receivable through an aperture in the support and abutting at their free ends, locking shoulders on the legs engageable with the inner face of the support when the spring clip is installed, and said supplemental portions being snugly engageable edgewise with the edges of the trim defining the opening for constraining the spring clip and trim member from relative rotation.

3. A spring clip device for securing a trim member having an opening to an apertured support and comprising a single piece of flat spring metal having a portion intermediate its ends in the form of a top, and supplemental portions at the ends thereof, respectively, and terminating in spaced relation to each other and to the top, said top having independently flexible locking fingers receivable within the said trim member through the opening by flexure of said fingers, said fingers returning toward their normal position for securing the trim member to the support, said supplemental portions being engageable at their portions which are spaced from the top with the outer face of the support and spacing said fingers from the outer face of the support for assisting entry of the clip between the margins of the trim member defining the opening, and portions extending from said supplemental portions and in the form of legs for reception through an aperture in the support and abutting at their free ends, locking shoulders on the legs engageable with the inner face of the support when the spring clip is installed.

4. A spring clip device for securing a trim member having an opening in one face with inturned flanges therealong to an apertured support and comprising a single piece of flat spring metal having a portion arranged for connection within the trim member, and portions in the form of legs receivable through an aperture in the support, locking shoulders on the legs engageable with the inner face of the support when the clip is installed, and said clip having portions each of which is rigid edgewise and is arranged for lying between and for snug engagement at its opposite edges with the edges respectively of the inturned flanges of the trim defining the opening for constraining the clip and trim from relative rotation and relative lateral movement.

5. A spring clip device for securing a trim member having an opening in one face with inturned flanges therealong to an apertured support and comprising a single piece of flat spring metal having a portion arranged for connection within the trim member and for receiving the inturned flanges therebeneath, and portions extending therefrom in the form of legs receivable through an aperture in the support, locking shoulders on the legs engageable with the inner face of the support when the clip is installed, and portions in the form of lands having face portions arranged for engagement with the outer face of the support, each of said land portions being arranged to lie between the free edges of the flanges with its opposite edges in engagement with the free edges of the flanges, respectively, of the trim defining the opening for constraining the clip and trim from relative rotation.

6. A spring clip device for securing a hollow trim member having an opening in one face with inturned flanges therealong to an apertured support and comprising a single piece of relatively flat spring metal having a top portion intermediate its ends, and end portions in the form of legs which are spaced apart flatwise from each other and extending at an angle to the plane of the top portion and convergent toward their free ends and into mutually abutting relationship at their free ends, said legs being receivable end-foremost upon flexure relatively together through an aperture in the said support, head portions on the edges of said top portion in the form of depending independently flexible locking fingers with their lower edges disposed toward the legs for engagement with the inturned flanges of the said trim member by flexure of said fingers, and said fingers reflexing for securing the trim member to the support in firm juxtaposition, said top portion having portions adjacent the other ends of the legs in the form of lands integral with and extending outwardly flatwise of the legs from the legs and engageable with the outer surface of the support for spacing the fingers a predetermined distance from the outer surface of the support preparatory to installation of the trim member.

7. A spring clip retaining device for securing a channel shaped trim strip having inturned flanges at its lateral edges to an apertured support and comprising a single piece of spring metal having a top portion intermediate its ends and end portions of the top portion in the form of legs extending at an angle to the plane of the top portion and convergent toward their free ends in abutting relation, said legs having outturned flanges thereon engageable with the inner surface of the support in edgewise contact when the clip is installed and providing locking shoulders for preventing withdrawal of the clip from the aperture, head portions on said top portion in the form of independently flexible locking fingers engageable within the said trim member by flexure of said fingers, said head portions returning toward their normal position for securing the trim member to the support, said top portion having portions adjacent the leg portions in the form of lands elongated in a direction normal to the axis of said legs and having portions extending upwardly from the support to render the spring action of said legs more effective, said lands being of substantially the same width as the distance between the said inturned flanges of the trim strip and adapted to pass and lie between the flanges of the trim strip and engage the outer face of the support when the clip is installed to space the said head portions upwardly a proper distance from the outer face of the support for assisting entry of the flanges of the trim strip preparatory to installation of the trim strip and prevent movement of the trim strip in any direction after installation.

JOHN H. VAN UUM.